Patented Aug. 23, 1949

2,479,873

UNITED STATES PATENT OFFICE 2,479,873

NITRO AMINES AND PROCESS FOR PREPARING THEM

Murray Senkus, Terre Haute, Ind., assignor to Commercial Solvents Corporation, Terre Haute, Ind., a corporation of Maryland No Drawing. Application February 26, 1945, Serial No. 579,895

6 Claims. (Cl. 260—570.9)

My invention relates to new nitro amines and to a process for the preparation thereof. Specifically, these new compounds may be represented by the following structural formula:

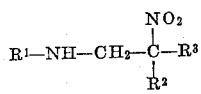

in which $R^1$ represents aralkyl and $R^2$ and $R^3$ represent lower alkyl groups.

As examples of nitro amines coming within the scope of the above formula there may be mentioned the following: N-(2-nitroisobutyl) benzylamine, 2-nitro-2-methyl-5-phenyl-4-azohexane, and the like.

This application is a continuation-in-part of my co-pending application, Serial No. 455,931 filed August 24, 1942, now abandoned.

Prior investigators in this field have found that primary nitroparaffins would react with N-(hydroxymethyl) dialkylamines; however, they also arrived at the conclusion, while making the aforesaid discovery, that N-(hydroxymethyl) monoalkylamines would not react with primary nitroparaffins, and that secondary nitroparaffins would neither react with N-hydroxymethyl mononor dialkylamines under any of the experimental conditions which they had found to be effective in condensing a primary nitroparaffin with N - (hydroxymethyl) - dialkylamines. Previous workers also were of the opinion, in view of their own experimental results, that neither primary nor secondary nitroparaffins would react with condensation products derivable from formaldehyde and ammonia, formaldehyde and primary alkylamines, formaldehyde and aniline, formaldehyde and diphenylamine, formaldehyde and N-methylaniline, and numerous other products of similar structure prepared from higher molecular weight aldehydes, and primary or secondary amines.

Contrary to that which would normally be expected in view of the above prior art findings, however, I have discovered that nitro amines of the type described may be prepared by reacting formaldehyde with a primary or secondary amine in which the N substituents are cyclic groups attached to the amino nitrogen through a $CH_2$ group to form the corresponding N-(hydroxymethyl) mono-, or diamine, which is in turn reacted with an equimolecular amount of a secondary nitroparaffin to produce a nitro amine of the type represented by the generic formula given above.

A modification of the above procedure may frequently be employed to advantage, and consists of reacting the desired amine with a suitable nitro alcohol. A solvent may be used if desired, but in general it will be found that a homogeneous solution can be obtained by agitating the mixture of amine and nitro alcohol. The products, produced by this process, are identical with those synthesized by the first mentioned method; however, the mechanism of the reaction in its initial stages is materially different from that involved in the first procedure. In this connection, it has been observed that primary nitro alcohols, when in the presence of a substance appreciably basic in character, decompose into formaldehyde and the nitroparaffin from which they were derived, and in instances where the basic material happens to be a primary or secondary amine, the liberated formaldehyde reacts therewith to form a N-(hydroxymethyl)-amine compound which then reacts with the nitroparaffin, produced by the decomposition of the nitro alcohol, in the same manner as described in the first procedure. The course of the reaction involved may be readily illustrated by the following series of equations:

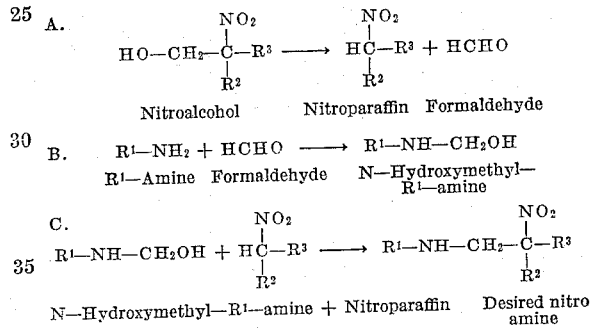

From an examination of the above series of equations, it will be evident that although the starting materials are different from those used in the process first described, both procedures may be considered equivalents of one another, since the compounds employed as starting materials in the first process are produced as intermediates in the second, after which said intermediates react in a manner identical with the mechanism involved in the reaction forming the basis of the first mentioned method. Therefore, it is to be specifically understood that the appended process claims include both methods.

The preparation of these nitro amines by either of the above-mentioned methods, is preferably effected at temperatures of from about 25°-30° C. Temperatures above this range may be used, but in doing so care should be exercised to avoid temperatures which cause the formaldehyde to be volatilized from the reaction mixture. In some cases it may be desirable to carry out the reaction in a high pressure reaction vessel. Under such circumstances, substantially higher temperatures may be utilized without loss of formaldehyde, and decomposition of the reactants, or the reaction products.

The amines which may be employed in preparing these new compositions of matter are represented by the formula:

$$R^1-NH$$

wherein $R^1$ represents aralkyl. As examples of such amines, there may be mentioned benzylamine, 1-phenyl-1-ethylamine, and the like.

Nitroparaffins that are operative in my process may be represented by the following formula:

wherein $R^2$ and $R^3$ represent alkyl groups.

Nitroparaffins typical of this class are 2-nitrobutane, 2-nitropropane, 2-nitropentane, and the like.

In reactions wherein nitro alcohols are employed instead of a nitroparaffin and formaldehyde, the following are examples of typical nitro alcohols which may be utilized: 2-nitro-2-methyl-1-propanol, 2-nitro-2-methyl-1-butanol, 2-nitro-2-ethyl-1-butanol, and the like.

The examples which follow are illustrative of the various types of nitro amines that come within the scope of the present invention. The examples are likewise illustrative of the procedures by which said products may be synthesized. It is to be specifically understood, however, that the following examples in no way limit the scope of my invention with respect to either the product or the process, since I have found that the reaction involved is very general in nature, and will occur, under the conditions described when reacting substantially any secondary nitroparaffin with a primary amine of the various types enumerated above.

Example I

One mole of benzylamine and one mole of 2-nitro-2-methyl-1-propanol were placed in a glass-stoppered reaction vessel and the mixture was shaken until it had become homogeneous. The mixture was allowed to stand at about 30° C. Water began to separate after about 10 hours. When the separation of water was substantially complete the crude product, N-(2-nitroisobutyl)benzylamine, was separated from the lower aqueous layer and was fractionated. Fractional distillation resulted in 156 parts of product corresponding to a conversion of 75%. The product had a nitrogen content of 13.59% as compared to a calculated value of 13.46%, a boiling point of 130–133° C. at 2 mm. and $n_D^{20}$ of 1.5178 and $d_{20}^{20}$ of 1.0785.

Example II

One mole of 1-phenyl-1-ethylamine and one mole of 2-nitro-2-methyl-1-propanol were placed in a glass-stoppered reaction vessel and the mixture was shaken until it had become homogeneous. The mixture was allowed to stand at about 30° C. Water began to separate after about 10 hours. When the separation of water was substantially complete the crude product, 2-nitro-2-methyl-5-phenyl-4-azahexane, was separated from the lower aqueous layer and was fractionated. Fractional distillation resulted in 166 parts of product corresponding to a conversion of 75%. The product had a nitrogen content of 12.85% as compared to a calculated value of 12.61%, a boiling point of 121-124° C. at .8 mm. and $n_D^{20}$ of 1.5080 and $d_{20}^{20}$ of 1.0809.

Example III 101 parts of tetrahydrofurfurylamine were placed in a reaction vessel fitted with a stirrer, thermometer, and dropping funnel then 75 parts of 35% aqueous formaldehyde were added to the amine during agitation. The mixture was externally cooled and the temperature maintained below 50° C., then 90 parts of 2-nitropropane were added to the reaction mixture and the mixture stirred for ½ hour when 500 parts of ethyl ether were added during stirring. Two layers separated and the non-aqueous layer was separated and distilled. Distillation resulted in 104 parts of N-(2-nitroisobutyl)tetrahydrofurfurylamine corresponding to a conversion of 75%. The product had a boiling point of 105° C. at 0.7 mm.

This example illustrates the embodiment of my process wherein formaldehyde is added to the reaction zone rather than being produced in situ through the decomposition of a nitroalcohol. In this embodiment of my process a condensation reaction is caused between formaldehyde, a primary amine and a nitroalkane, as described previously.

The nitro amines of my invention are in general either colorless liquids or white waxy solids. The low-molecular-weight nitro amines possess characteristic pungent odors, whereas the high-molecular-weight nitroamines are relatively odorless. The nitro amines are soluble in ether, methanol, and benzene, but are insoluble in water.

Some of the nitro amines of my invention have been found to be useful as toxicants in insect sprays. They are likewise useful as intermediates in the preparation of numerous organic compounds. Other uses of these products will readily occur to those skilled in the art.

Now having described my invention, what I claim is:

1. In the preparation of nitro amines, the process which comprises causing a condensation reaction between formaldehyde, a primary aralkylamine having the formula $R^1-NH_2$ and a nitroalkane having the formula:

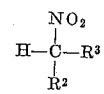

at temperatures above about 25° C. but below those causing any substantial loss of formaldehyde from the mixture and recovering the resulting nitroamine having the formula:

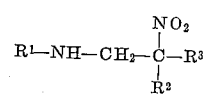

wherein $R^1$ represents an aralkyl group and $R^2$ and $R^3$ represent lower alkyl groups.

2. The process of claim 1 wherein the formaldehyde and nitroalkane in the reaction mixture are derived from the decomposition in situ of a nitroalcohol having the formula:

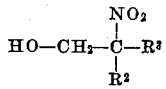

wherein $R^2$ and $R^3$ have their prior significancies.

3. The process of claim 1 wherein the condensation reaction is conducted within the temperature range of about 25° to 30° C.

4. In the preparation of N-(1-nitroisobutyl)-benzylamine, the process which comprises causing a condensation reaction to take place between benzylamine and 2-nitro-2-methyl-1-propanol at temperatures above about 25° C. but below those causing any substantial loss of formaldehyde from the mixture and recovering the resulting N-(2-nitroisobutyl)benzylamine thereby formed.

5. Nitroamines having the following structural formula:

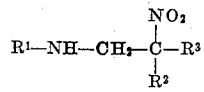

wherein $R^1$ represents aralkyl, and $R^2$ and $R^3$ represent lower alkyl groups.

6. N-(2-nitroisobutyl)benzylamine.

MURRAY SENKUS.

REFERENCES CITED

The following references are of record in the file of this patent:

UNITED STATES PATENTS

| Number | Name | Date |
|---|---|---|
| 2,253,082 | McNally et al. | Aug. 19, 1941 |
| 2,292,212 | Dickey et al. | Aug. 4, 1942 |
| 2,206,885 | Dickey et al. | July 9, 1940 |

OTHER REFERENCES

Chemical Abstract, 1938, page 494.